(12) United States Patent
Krauss

(10) Patent No.: US 10,122,805 B2
(45) Date of Patent: Nov. 6, 2018

(54) IDENTIFICATION OF COLLABORATING AND GATHERING ENTITIES

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 63 days.

(21) Appl. No.: 14/788,185

(22) Filed: Jun. 30, 2015

(65) Prior Publication Data

US 2017/0006121 A1    Jan. 5, 2017

(51) Int. Cl.
  *H04L 29/08* (2006.01)
  *G06Q 30/02* (2012.01)
  *G06Q 50/00* (2012.01)

(52) U.S. Cl.
  CPC ......... *H04L 67/22* (2013.01); *G06Q 30/0201* (2013.01); *G06Q 50/01* (2013.01)

(58) Field of Classification Search
  CPC ........ G06Q 50/01; G06Q 10/10; G06Q 30/02; G06Q 10/107; G06Q 10/00; G06Q 30/0631; G06F 17/3053; G06F 17/30867; G06F 3/0481; G06F 17/30958; H04W 4/206; H04W 4/008; H04W 4/023; H04W 4/001; H04W 4/06; H04L 51/32; H04L 67/306; H04L 51/04; H04L 65/403; H04L 61/1594; H04L 67/22; H04L 67/42
  See application file for complete search history.

(56) References Cited

U.S. PATENT DOCUMENTS

| | | |
|---|---|---|
| 4,773,861 A | 9/1988 | Dufour |
| 5,895,465 A | 4/1999 | Guha |
| 5,991,758 A | 11/1999 | Ellard |
| 6,943,724 B1 | 9/2005 | Brace et al. |
| 7,096,259 B1 | 8/2006 | Gray et al. |
| 7,366,632 B2 | 4/2008 | Hamann et al. |
| 7,373,246 B2 | 5/2008 | O'Clair |

(Continued)

FOREIGN PATENT DOCUMENTS

| | | |
|---|---|---|
| CN | 102567439 A | 7/2012 |
| CN | 102568035 A | 7/2012 |

(Continued)

OTHER PUBLICATIONS

Notice of Appeal, Feb. 1, 2016, for U.S. Appl. No. 13/585,066, filed Aug. 14, 2012 by G.G. Adair et al., Total 2 pp.

(Continued)

*Primary Examiner* — Ninos Donabed
(74) *Attorney, Agent, or Firm* — Janaki K. Davda; Konrad, Raynes, Davda & Victor LLP

(57) ABSTRACT

Provided are techniques for identification of collaborating entities. It is determined whether a first entity is associated with a second entity on at least a certain number of occasions over a certain first time interval. In response to a positive determination, a first instance of affinity is found between the first entity and the second entity. A collaboration is identified based on the first instance of affinity and one or more second instances of affinity found within one or more certain portions of a second time interval. The collaboration of the first entity and the second entity is reported.

15 Claims, 10 Drawing Sheets

(56) References Cited

U.S. PATENT DOCUMENTS

| | | | |
|---|---|---|---|
| 7,707,122 B2* | 4/2010 | Hull | G06Q 50/01 |
| | | | 705/319 |
| 7,926,111 B2 | 4/2011 | Oliver et al. | |
| 7,966,291 B1 | 6/2011 | Petrovic et al. | |
| 8,015,137 B2 | 9/2011 | Allen et al. | |
| 8,204,213 B2 | 6/2012 | Hunt et al. | |
| 8,229,766 B2 | 7/2012 | Carttar et al. | |
| 8,244,502 B2 | 8/2012 | Hamann et al. | |
| 8,306,794 B2 | 11/2012 | Hamann et al. | |
| 8,514,226 B2* | 8/2013 | Zafar | G06Q 10/10 |
| | | | 345/440 |
| 8,606,721 B1* | 12/2013 | Dicker | G06Q 10/10 |
| | | | 705/319 |
| 9,230,258 B2 | 1/2016 | Adair et al. | |
| 9,270,451 B2 | 2/2016 | Jonas et al. | |
| 9,332,032 B2* | 5/2016 | Dunne | H04L 63/20 |
| 9,338,001 B2 | 5/2016 | Jonas et al. | |
| 9,525,969 B2* | 12/2016 | Evans | H04W 4/02 |
| 9,525,970 B2* | 12/2016 | Farley | H04W 64/00 |
| 9,615,371 B1* | 4/2017 | de Barros Chapiewski | |
| | | | H04W 4/023 |
| 2002/0095319 A1 | 7/2002 | Swart et al. | |
| 2003/0130987 A1 | 7/2003 | Edlund et al. | |
| 2004/0203868 A1 | 10/2004 | Eidson | |
| 2004/0210763 A1 | 10/2004 | Jonas | |
| 2007/0067285 A1 | 3/2007 | Blume et al. | |
| 2007/0132767 A1 | 6/2007 | Wright et al. | |
| 2008/0033933 A1 | 2/2008 | Cookson et al. | |
| 2008/0098008 A1 | 4/2008 | Eid | |
| 2008/0120271 A1 | 5/2008 | Hunt et al. | |
| 2008/0125969 A1 | 5/2008 | Chen et al. | |
| 2008/0243885 A1 | 10/2008 | Harger et al. | |
| 2008/0288193 A1 | 11/2008 | Claassen et al. | |
| 2009/0006349 A1 | 1/2009 | Fuxman et al. | |
| 2009/0012898 A1 | 1/2009 | Sharma et al. | |
| 2009/0055719 A1 | 2/2009 | Cossins et al. | |
| 2009/0077113 A1 | 3/2009 | Fidaali et al. | |
| 2009/0106242 A1 | 4/2009 | Mcgrew et al. | |
| 2009/0157593 A1 | 6/2009 | Hayashi et al. | |
| 2009/0164811 A1 | 6/2009 | Sharma et al. | |
| 2009/0234869 A1 | 9/2009 | Azvine et al. | |
| 2009/0239467 A1* | 9/2009 | Gulin | G08B 5/36 |
| | | | 455/41.2 |
| 2009/0248687 A1 | 10/2009 | Su et al. | |
| 2009/0248738 A1 | 10/2009 | Martinez et al. | |
| 2009/0265106 A1 | 10/2009 | Bearman et al. | |
| 2009/0326879 A1 | 12/2009 | Hamann et al. | |
| 2009/0326884 A1 | 12/2009 | Amemiya et al. | |
| 2010/0197318 A1 | 8/2010 | Petersen et al. | |
| 2011/0040532 A1 | 2/2011 | Hamann et al. | |
| 2011/0060561 A1 | 3/2011 | Lugo et al. | |
| 2011/0087495 A1 | 4/2011 | O'Neill et al. | |
| 2011/0246494 A1 | 10/2011 | Adair et al. | |
| 2011/0302128 A1 | 12/2011 | Hayashi et al. | |
| 2012/0029956 A1 | 2/2012 | Ghosh et al. | |
| 2012/0084859 A1 | 4/2012 | Radinsky et al. | |
| 2012/0089859 A1 | 4/2012 | Wang et al. | |
| 2012/0106738 A1 | 5/2012 | Belenkiy et al. | |
| 2012/0166347 A1 | 6/2012 | Lacal | |
| 2012/0226889 A1 | 9/2012 | Merriman et al. | |
| 2012/0320815 A1 | 12/2012 | Massena | |
| 2013/0282811 A1* | 10/2013 | Lessin | G06Q 50/01 |
| | | | 709/204 |
| 2014/0006377 A1* | 1/2014 | Astore | G06F 17/30867 |
| | | | 707/710 |
| 2014/0019544 A1 | 1/2014 | Palmert | |
| 2014/0052685 A1 | 2/2014 | Adair et al. | |
| 2014/0123300 A1 | 5/2014 | Jung et al. | |
| 2014/0141720 A1* | 5/2014 | Princen | H04L 63/0407 |
| | | | 455/41.2 |
| 2014/0257740 A1 | 9/2014 | Hamann et al. | |
| 2014/0270482 A1* | 9/2014 | Chakraborty | G06K 9/00221 |
| | | | 382/154 |
| 2014/0306833 A1* | 10/2014 | Ricci | B60Q 1/00 |
| | | | 340/901 |
| 2014/0309789 A1* | 10/2014 | Ricci | B60Q 1/00 |
| | | | 700/276 |
| 2015/0098565 A1 | 4/2015 | Jonas et al. | |
| 2015/0101061 A1 | 4/2015 | Jonas et al. | |
| 2015/0356257 A1* | 12/2015 | Wright | H04L 9/0643 |
| | | | 705/51 |

FOREIGN PATENT DOCUMENTS

| | | |
|---|---|---|
| EP | 2579201 | 10/2013 |
| EP | 2652887 | 6/2014 |
| JP | 2010237832 A | 10/2010 |
| WO | 2010065429 | 6/2010 |
| WO | 2012082722 | 6/2012 |

OTHER PUBLICATIONS

Pre-Appeal Brief Request for Review, Feb. 1, 2016, for U.S. Appl. No. 13/585,066, filed Aug. 14, 2012 by G.G. Adair et al., Total 6 pp.

Response to Final Office Action, dated Jan. 13, 2016, for U.S. Appl. No. US14/312,085, filed Jun. 23, 2014 by J.J. Jonas et al., Total 6 pp.

Notice of Allowance, dated Feb. 4, 2016, for U.S. Appl. No. 14/312,085, filed Jun. 23, 2014 by J.J. Jonas et al., Total 11 pp.

Notice of Allowance, dated Aug. 10, 2016, for U.S. Appl. No. 13/585,066, filed Aug. 14, 2012 by G.G. Adair et al., Total 7 pp.

Response to Office Action 3, dated Jul. 8, 2015, for U.S. Appl. No. 13/585,066, filed Aug. 14, 2012 by G.G. Adair et al., Total 11 pp.

Written Opinion, dated Dec. 2, 2014, for International Application No. PCT/JP2014/004558, Total 5 pp.

English Abstract for WO2012082722, published on Jun. 21, 2012, Total 2 pp.

Notice of Allowance 3, dated Aug. 26, 2015, for U.S. Appl. No. 12/752,386, filed Apr. 1, 2010 by G.G. Adair et al., Total 11 pp.

Final Office Action, dated Jul. 14, 2015, for U.S. Appl. No. 14/045,718, filed Oct. 3, 2013 by J.J. Jonas et al., Total 19 pp.

Response to Final Office Action, dated Sep. 21, 2015, for U.S. Appl. No. 14/045,718, filed Oct. 3, 2013 by J.J. Jonas et al., Total 11 pp.

Office Action 1, dated Aug. 10, 2015, for U.S. Appl. No. 14/312,085, filed Jun. 23, 2014 by J.J. Jonas et al., Total 35 pp.

Response to Office Action 1, dated Sep. 21, 2015, for U.S. Appl. No. 14/312,085, filed Jun. 23, 2014 by J.J. Jonas et al., Total 8 pp.

Final Office Action, dated Oct. 30, 2015, for U.S. Appl. No. 13/585,066, filed Aug. 14, 2012 by G.G. Adair et al., Total 19 pp.

Notice of Allowance, dated Nov. 6, 2015, for U.S. Appl. No. 14/045,718, filed Oct. 3, 2013 by J.J. Jonas et al., Total 14 pp.

Final Office Action, dated Nov. 13, 2015, for U.S. Appl. No. 14/312,085, filed Jun. 23, 2014, by J.J. Jonas et al., Total 16 pp.

Office Action, dated May 15, 2017, for U.S. Appl. No. 13/585,066, filed Aug. 14, 2012 by G.G. Adair et al., Total 7 pp.

List of IBM Patents or Patent Applications Treated as Related, Feb. 21, 2017, Total 2 pp.

U.S. Appl. No. 13/585,066, filed Aug. 14, 2012, entitled "Context Accumulation Based on Properties of Entity Features", invented by G.G. Adair et al., Total 36 pp.

U.S. Appl. No. 12/752,386, filed Apr. 1, 2010, entitled "Space and Time for Entity Resolution", invented by G.G. Adair et al., Total 41 pp.

U.S. Appl. No. 14/045,718, filed Oct. 3, 2013, entitled "Privacy Enhanced Spatial Analytics", invented by J.J. Jonas et al., Total 49 pp.

U.S. Appl. No. 14/312,085, filed Jun. 23, 2014, entitled "Privacy Enhanced Spatial Analytics", invented by J.J. Jonas et al., Total 49 pp.

Notice of Allowance 2, dated Nov. 22, 2016, U.S. Appl. No. 13/585,066, filed Aug. 14, 2012 by G.G. Adair et al., Total 9 pp.

Notice of Allowance 3, dated Jan. 30, 2017, for U.S. Appl. No. 13/585,066, filed Aug. 14, 2012 by G.G. Adair et al., Total 9 pp.

Office Action 1, dated Jul. 30, 2014, for U.S. Appl. No. 13/585,066, filed Aug. 14, 2012 by G.G. Adair et al., Total 15 pp.

(56) References Cited

OTHER PUBLICATIONS

Response to Office Action 1, dated Oct. 30, 2014, for U.S. Appl. No. 13/585,066, filed Aug. 14, 2012 by G.G. Adair et al., Total 10 pp.
Final Office Action 1, dated Dec. 5, 2014, for U.S. Appl. No. 13/585,066, filed Aug. 14, 2012 by G.G. Adair et al., Total 16 pp.
Response to Final Office Action, dated Feb. 27, 2015, for U.S. Appl. No. 13/585,066, filed Aug. 14, 2012 by G.G. Adair et al., Total 11 pp.
Office Action 3, dated Apr. 8, 2015, for U.S. Appl. No. 13/585,066, filed Aug. 14, 2012 by G.G. Adair et al., Total 8 pp.
Preliminary Amendment, Jun. 23, 2014, for U.S. Appl. No. 14/045,718, filed Oct. 3, 2013 by J.J. Jonas et al., Total 5 pp.
Office Action 1, Dec. 18, 2014, for U.S. Appl. No. 14/045,718, filed Oct. 3, 2013 by J.J. Jonas et al., Total 21 pp.
Response to Office Action 1, Mar. 30, 2015, for U.S. Appl. No. 14/045,718, filed Oct. 3, 2013 by J.J. Jonas et al., Total 9 pp.
Christen, P. and R. Gayler, "Towards Scalable Real-Time Entity Resolution Using a Similarity-Aware InvertedIndex Approach",© 2008, Australian Computer Society, Inc., Total 10 pp (Also the Australian National University, DCanberra ACT 0200, 2008).
Dey, D.; Sarkar, S.; De, P.;, "A distance-based approach to entity reconciliation in heterogeneous databases," Knowledge and Data Engineering, IEEE Transactions on , vol. 14, No. 3, pp. 567-582, May/Jun. 2002doi: 10.11 09/TKDE.2002.1 000343.
Isebox. ©2010 HumanGeo, LLC: <http://www.thehumangeo.com/solutions_isebox.php>: Downloaded Apr. 9, 2013. pp. 1-2.
International Search Report, dated Dec. 2, 2014, for PCT/JP2014/004558, Total 2 pp.
International Search Report and Written Opinion, dated Dec. 2, 2014, for PCT/JP2014/004558, Total 2 pp.
Jeff Jonas "Entity Resolution Systems vs. Match Merge/Merge Purge/List De-duplication Systems". Sep. 25, 2007.http:/ /jeffjonas.typepad.com/jeff_jonas/2007 /09/entity-resoluti. html.
Jonas, J., "Threat and Fraud Intelligence, Las Vegas Style",© 2006 IEEE, Total 8 pp.
Kang, H., L Getoor, B. Shneiderman, M. Bilgic, and L Licamele, "Interactive Entity Resolution in RelationalData: A Visual Analytic Tool and Its Evaluation", IEEE Trans. on vol. 14, No. 5, Sep.-Oct. 2008, pp. 999-1014, DTotal16 pp.
Mailin, B. and L Sweeney, "EN RES: A Semantic Framework for Entity Resolution Modelling", School of Computer Science, Carnegie Mellon University, Nov. 2005, Total 18 pp.
Maludrottu, S., M. Beoldo, M. Soto Alvarez, and C. Regazzoni, "A Bayesian Framework for Online Interaction Classification", 2010 Seventh IEEE International Conference on Advanced Video and Signal Based Surveillance, ©2010 IEEE, Total 6 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Jan. 2011, Computer Security Division Information Technology Laboratory National Institute of Standards and Technology, Total 7 pp.
Moussa, W.A., J. Jessel, and E. Dubois, "Notational-based Prototyping of Mixed Interactions", In Proceedings of the 5th IEEE and ACM International Symposium on Mixed and Augmented Reality, ©2006 IEEE, Total 2 pp.
Pugh, W., "Skip Lists: A Probabilistic Alternative to Balanced Trees", Jun. 1990, retrieved from the Internet at <URL: ftp://ftp.cs.umd.edu/pub/skipLists/skiplists.pdf>, Total 8 pp.
Sheth, A. and M. Perry, "Traveling the Semantic Web Through Space, Time, and Theme",© 2008 IEEE, Total 6 pp (Also IEEE Internet Computing, vol. 12, ISS. 2, Mar.-Apr. 2008, pp. 81-86).
Singla, P. and P. Domingos, "Entity Resolution with Markov Logic", Data Mining, 2006, Department of Computer Science and Engineering, ICDM'06, Sixth International Conference on IEEE,
2006. [Online], <retrieved Jul. 22, 2014>. <http://www.cse.iitd.ac.in/~parags/papers/erml-icdm06.pdf>, Total 11 pp.
Whang, S.E., and H. Garcia-Molina, "Entity Resolution with Evolving Rules", Proceedings of the VLDB Endowment, vol. 3, No. 1, Computer Science Department, Stanford University, © 2010 VLDB Endowment, Total 12 pp.
Whang, S.E., O. Benjelloun, and H. Garcia-Molina, "Generic Entity Resolution with Negative Rules", The VLDB Journal, The International Journal on Very Large Data Bases 18.6 (2009): 1261-1277. Received: Mar. 27, 2008, Revised: Jan. 7, 2009, Accepted: Jan. 12, 2009, © Springer-Verlag 2009, Published online: Feb. 28, 2009, [online] <retrieved Jul. 22, 2014> <http://swhig.web.unc.edu/files/2011/10/negativerules.pdf>, Total 17 pp.
Notice of Allowance 2, May 18, 2015, for U.S. Appl. No. 12/752,386, filed Apr. 1, 2010 by G.G. Adair et al., Total 11 pp.
Whitney, Bill: "Skip Lists in C++": Dr. Dobb's The World of Software Development. Nov. 1, 1998. URL:http://www.drdobbs.conn/cpp/skip-lists-in-c/184403579. Downloaded Apr. 9, 2013. Total 4 pp.
Preliminary Amendment, Jun. 23, 2014, for U.S. Appl. No. 14/312,085, filed Jun. 23, 2014 by J.J. Jonas et al., Total 6 pp.
http://en.wikipedia.org/wiki/Circle_of_latitude, "Circle of latitude" printed Jul. 24, 2013.
Geohash: From Wikipedia, the free encyclopedia. <http://en.wikipedia.org/w/index.php?title=Geohash&oldid=543362297>: Downloaded Apr. 9, 2013. pp. 1-6.
Zhang, Jie. Dissertation: "Spatio-Temporal Aggregates over Streaming Geospatial Image Data": Jun. 2007. <http://www.cs.ucdavis.edu/research/tech-reports/2007/CSE-2007-29.pdf> Downloaded Apr. 9, 2013. pp. 1-145.
English Abstract for EP2652887, published on Jun. 25, 2014, Total 2 pp.
Amendment 1, Jul. 16, 2012, for U.S. Appl. No. 12/752,386, filed Apr. 1, 2010 by G.G. Adair et al., Total 14 pp.
Amendment 2, Dec. 10, 2012, for U.S. Appl. No. 12/752,386, filed Apr. 1, 2010 by G.G. Adair et al., Total 15 pp.
Final Office Action 1, dated Sep. 10, 2012, for U.S. Appl. No. 12/752,386, filed Apr. 1, 2010 by G.G. Adair et al., Total 20 pp.
Office Action 1, Mar. 28, 2012, for U.S. Appl. No. 12/752,386, filed Apr. 1, 2010 by G.G. Adair et al., Total 19 pp.
Office Action 3, dated Apr. 30, 2014, for U.S. Appl. No. 12/752,386, filed Apr. 1, 2010 by G.G. Adair et al., Total 15 pp.
Response to Office Action 3, dated Jul. 30, 2014, for U.S. Appl. No. 12/752,386, filed Apr. 1, 2010 by G.G. Adair et al., Total 13 pp.
Notice of Allowance, Nov. 28, 2014, for U.S. Appl. No. 12/752,386, filed Apr. 1, 2010 by G.G. Adair et al., Total 16 pp.
Wikipedia, "Vincenty's Formulae", [online], [Retrieved on Jun. 29, 2015]. Retrieved from the Internet at <URL: https://en.wikipedia.org/wiki/Vincenty%27s_formulae>, page last modified on Apr. 22, 2015, Total 5 pp.
English Abstract for CN102567439A, published on Jul. 11, 2012, Total 1 p.
English Abstract for CN102568035A, published on Jul. 11, 2012, Total 1 p.
English Abstract and Machine Translation for JP2010237832A, published on Oct. 21, 2010, Total 27 pp.
Final Office Action 3, dated Nov. 15, 2017, for U.S. Appl. No. 13/585,066, filed Aug. 14, 2012 by G.G. Adair et al., Total 11 pp.
Office Action 7, dated Apr. 4, 2018, for U.S. Appl. No. 13/585,066, filed Aug. 14, 2012 by G.G. Adair et al., Total 9 pp.
Response to Final Office Action 3, dated Feb. 15, 2018, for U.S. Appl. No. 13/585,066, filed Aug. 14, 2012 by G.G. Adair et al., Total 18 pp.
Response to Office Action for U.S. Appl. No. 13/585,066, pp. 19, dated Jul. 5, 2018.

* cited by examiner

IDENTIFICATION OF COLLABORATING AND GATHERING ENTITIES

BACKGROUND

Embodiments of the invention relate to determining relationships among entities. For example, embodiments of the invention relate to privacy enhanced identification of mutually friendly entities (e.g., friends). Embodiments also relate to privacy enhanced identification of collaborating and gathering entities. Embodiments relate to software-implemented behavioral analytics and involve event-driven observation and tracking of physical entities in order to flag occurrences of certain repeating entity behavior.

An entity may be any object, such as a person, place, thing, or event. Entity analytics systems attempt to identify two or more entities as related based on some features that the entities share. For example, two entities with the same address may be treated as related.

SUMMARY

Provided is a method for privacy enhanced identification of collaborating entities. The method comprises determining whether a first entity is associated with a second entity on at least a certain number of occasions over a certain first time interval; in response to a positive determination, finding a first instance of affinity between the first entity and the second entity; identifying a collaboration based on the first instance of affinity and one or more second instances of affinity found within one or more certain portions of a second time interval; and reporting the collaboration of the first entity and the second entity.

Provided is a computer program product for privacy enhanced identification of collaborating entities. The computer program product comprises a computer readable storage medium having program code embodied therewith, the program code executable by at least one processor to perform: determining whether a first entity is associated with a second entity on at least a certain number of occasions over a certain first time interval; in response to a positive determination, finding a first instance of affinity between the first entity and the second entity; identifying a collaboration based on the first instance of affinity and one or more second instances of affinity found within one or more certain portions of a second time interval; and reporting the collaboration of the first entity and the second entity.

Provided is a computer system for privacy enhanced identification of collaborating entities. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: determining whether a first entity is associated with a second entity on at least a certain number of occasions over a certain first time interval; in response to a positive determination, finding a first instance of affinity between the first entity and the second entity; identifying a collaboration based on the first instance of affinity and one or more second instances of affinity found within one or more certain portions of a second time interval; and reporting the collaboration of the first entity and the second entity.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
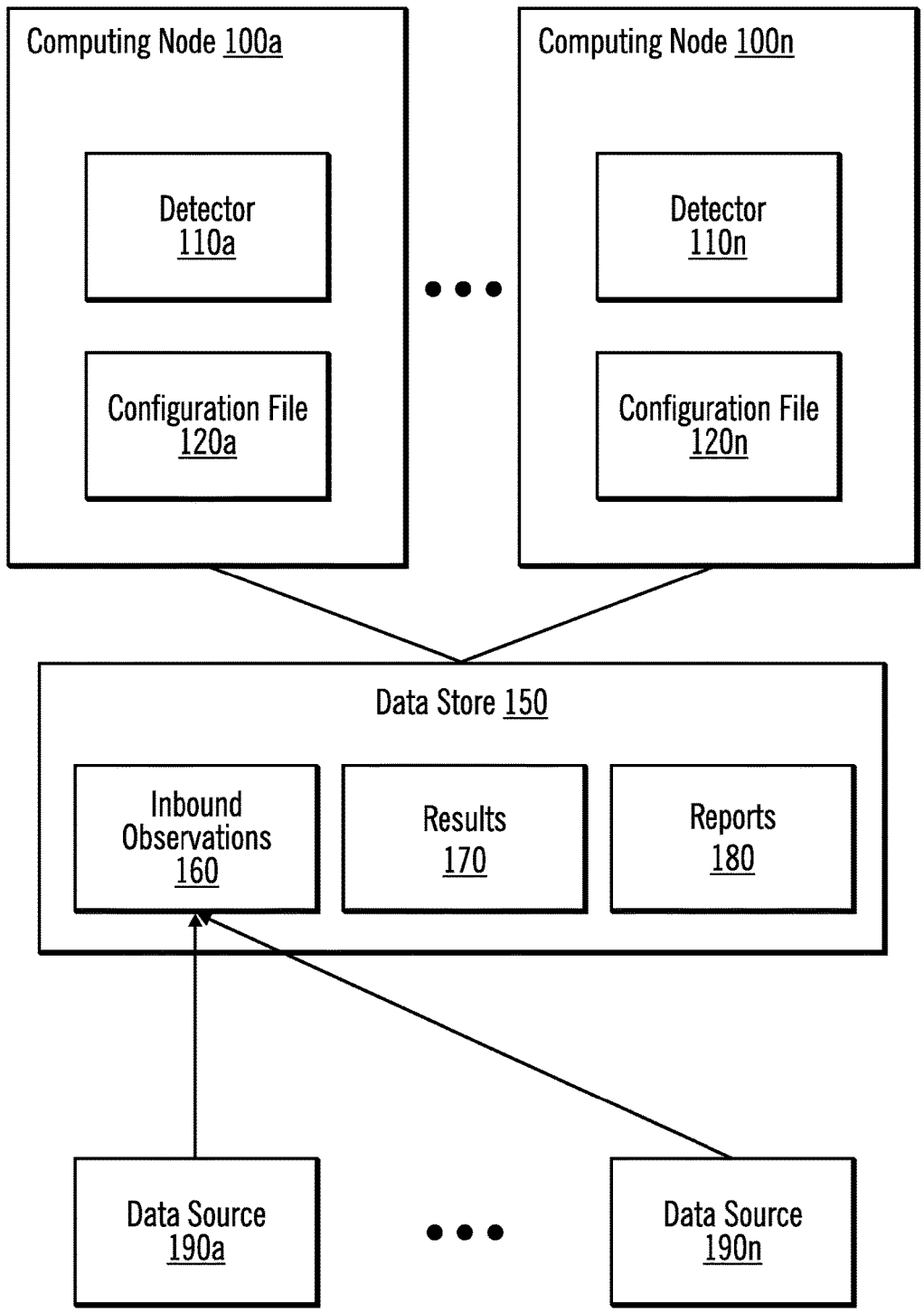
FIG. 1 illustrates, in a block diagram, a computing environment in accordance with certain embodiments.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Entity analytics products may find observed physical entities to be related by features they have in common, such as their proximity in space and time. However, some entity interactions become of interest when they are observed to repeat a certain number of times. Two entities that happen to pass by each other occasionally, or even to be located in the same vicinity as one another for some time, may have no significant relationship. On the other hand, entities that meet in various locations over and over, spanning a timeframe too long for those meetings to be written off as chance encounters, are likely to have a reason for those meetings. Meetings of entities, either physically or virtually via a communication medium, may indicate a kind of entity relationship worthwhile to identify. Meetings that repeat, and/or meetings that involve a significant number of entities, also may be worthwhile to distinguish from smaller or non-repeating entity interactions.

Entities that have a physical affinity with each other may be identified when a first entity is observed within a certain spatial proximity of a second entity, on at least a certain number of occasions (e.g., at least a certain number of times), over a certain time interval. Entities that have a virtual affinity with each other may be identified when a first entity is observed to communicate (e.g., electronically by electronic mail (e-mail), a chat session, a telephone conversation or teleconference, radio communication, etc.) or otherwise interact with a second entity, on at least a certain number of occasions, over a certain time interval. With embodiments, the entities may meet at different locations, over time, and yet qualify as having an affinity. In certain embodiments, a minimum number of entities, or a minimum number of affinity occurrences, may be set to qualify for reporting as "a gathering" or as "collaborators", respectively.

Affinities may qualify for reporting as-is, or based on a required number of involved entities (e.g., identifying "a gathering"), or based on repeating occurrences of affinity (e.g., identifying "collaborators"). A gathering may be reported when a certain number of entities is observed to accumulate within a certain physical distance of each other or when a certain number of entities virtually interact with each other, per the aforementioned criteria that define what "affinity with each other" means. A situation in which entities behave as collaborators may be reported when the entities meet or interact on an ongoing basis.

In particular, in certain embodiments, affinities by themselves may not be interesting. In some situations, affinities may be identified as the result of chance encounters, misdirection or confusion, or loose associations, etc., rather than as the result of a deeper relationship. For example, a software component that is used in conjunction with, or made part of, an entity analytics product in accordance with certain embodiments, may be configured in a privacy-enhanced manner to identify affinities among persons by receiving inbound observations of interactions between those persons. Such a software component may identify an affinity by counting each encounter, among the inbound observations, between a shopper at checkout and a store clerk. Based on the software component's configuration settings, it may identify these affinities simply because the store clerk is present while item after item gets scanned through, rung up, and bagged. However, this type of affinity may not be of interest.

A collaboration (or "collaborating entities") and a gathering are each defined in terms of affinities. In certain embodiments, a collaboration may involve as few as two entities. In certain embodiments, a gathering may involve more than two entities.

A collaboration may be identified when embodiments keep finding affinities among any two entities—that is, some number of affinities over some time interval that is a longer interval than is used to detect the underlying affinities themselves. This means that these identical entities show a consistent behavior of getting together, and for more than one observation at a time, not only over and over, but often enough so that embodiments determine that they collaborate. For example, say the store clerk of the previous example keeps leaving work together with another person. Based on observations of this repeating behavior among the inbound data, the software component of the previous example may identify a collaboration between the store clerk and the other person. The collaboration may be worth reporting. This reporting may be especially useful if there are other factors that are of interest to the software component's users for the time interval (e.g., if a suspected crime were to occur during that time interval).

A gathering may be identified when embodiments detect affinities among large numbers of entities. Unlike with collaboration findings, the entities need not get together repeatedly for the time that it takes to find an affinity over and over. They instead can get together in sufficiently large numbers at once, for long enough to find the affinities among them all, to qualify as a gathering. Because a gathering is identified based on affinities, the gathering can indicate something more than just a bunch of people visiting the park and happening to pass by each other around, say, a fountain, on the way through. The entire set of those particular entities must remain together for a configurable time span that qualifies for an affinity finding, before embodiments generate a configurable number of affinity findings on which a gathering report may be based.

FIG. 1 illustrates, in a block diagram, a computing environment in accordance with certain embodiments. Computing nodes 100a . . . 100n are coupled to each other and to a data store 150. The ellipses indicate that there may be any number of computing nodes in various embodiments. Each of the computing nodes 100a . . . 100n includes, respectively, a detector 110a . . . 110n and a configuration file 120a . . . 120n. The detector 110a . . . 110n may detect affinities, collaborators (or "collaborations"), and gatherings. The use of a file for configuration purposes is illustrative, and other configuration means may apply for some embodiments. In various embodiments the detector 110a . . . 110n may be, as in the previous example, a software component that is used in conjunction with, or made part of, an entity analytics product. In some embodiments, the detector 110a . . . 110n may run as an operator for a stream computing system that performs analytics on real-time data. In some embodiments, the detector 110a . . . 110n may assume other forms.

The data store 150 includes inbound observations 160, results 170 (e.g., that identify collaborators and gatherings), and reports 180 (e.g., that provide information about the collaborators and the gatherings). The inbound observations 160 are from one or more data sources 190a . . . 190n and may include data received with respect to the locations of different entities (e.g., from satellite or ground-based navigational systems, from the Automatic Identification System (AIS) tracking system for oceangoing vessels, from devices such as smart phones or radio-frequency identification (RFID) tags carried by the entities, or from software that can determine the motion of entities depicted in a series of images, to name a few examples). Although one data store is illustrated, the computing nodes 100a . . . 100n may be coupled to and may communicate with any number of data stores.

The computing nodes 100a . . . 100n may be parallel processing nodes. The data store 150 may store big data (i.e., a large amount of structured, semi-structured, or unstructured data accessed and stored via an Apache™ Hadoop® software framework, a Hadoop Distributed File System (HDFS™) software framework, a stream computing platform, or other means of accessing and storing such data). Apache, Hadoop, and Hadoop Distributed File System (HDFS) are trademarks or registered trademarks of the Apache Software Foundation in the United States and/or other countries. Thus, certain embodiments provide a big data, parallel-processing-ready technique for identifying collaborating entities. For scalability of certain embodiments, any event accumulation beyond the time interval is thrown away and event accumulation begins anew. The time and proximity horizons are configurable according to the entity type (e.g. oceangoing vessels may need larger horizons, for both space and time, than cultured bacteria) and may be concurrently applied at different granularities to entities in the same dataset. Therefore, embodiments provide high-performance, highly scalable determination of mutually collaborating entities or gatherings of entities over very large datasets.

The detector 110a . . . 110n monitors the movement and/or communication and interaction behavior of entities, flagging conditions where an entity is observed meeting or interacting with another entity. Multiple entities may be flagged to meet or interact together. The data sources, entity types, geographic areas, and communication/interaction techniques covered by affinity detection may be user-configurable. The detector 110a . . . 110n may use in-memory event tracking to detect affinities with optimum efficiency.

In certain embodiments, because the detector 110a . . . 110n in-memory event data is not shared across processes, incoming behavioral data for a particular entity may be consistently passed to a particular detector node tracking that entity. Embodiments may implement the association between entity identifiers and computing nodes via a simple modulo function.

The detector 110a ... 110n in-memory event data may be volatile. Whenever the detector 110a ... 110n is exited and restarted, any work-in-progress affinities may be lost. This means stopping and re-starting the detector 110a ... 110n may affect which affinities are detected. In certain embodiments, when the detector 110a ... 110n is restarted, applicable behavioral records from behavioral data history (e.g., going back 48 hours) may be processed by the detector 110a ... 110n.

In certain embodiments, affinities may be detected based on configurable time windows or time horizons whose durations have practical limits based on the number of entities and events that are tracked. Events expire as time moves on past those time horizons, and the memory used for tracking expired events is reclaimed. A user who needs to set up horizons of very wide-ranging durations (as with detection of varying types of entities that are collaborators) may assign tasks to multiple detector processes for scalability.

Figure 2:
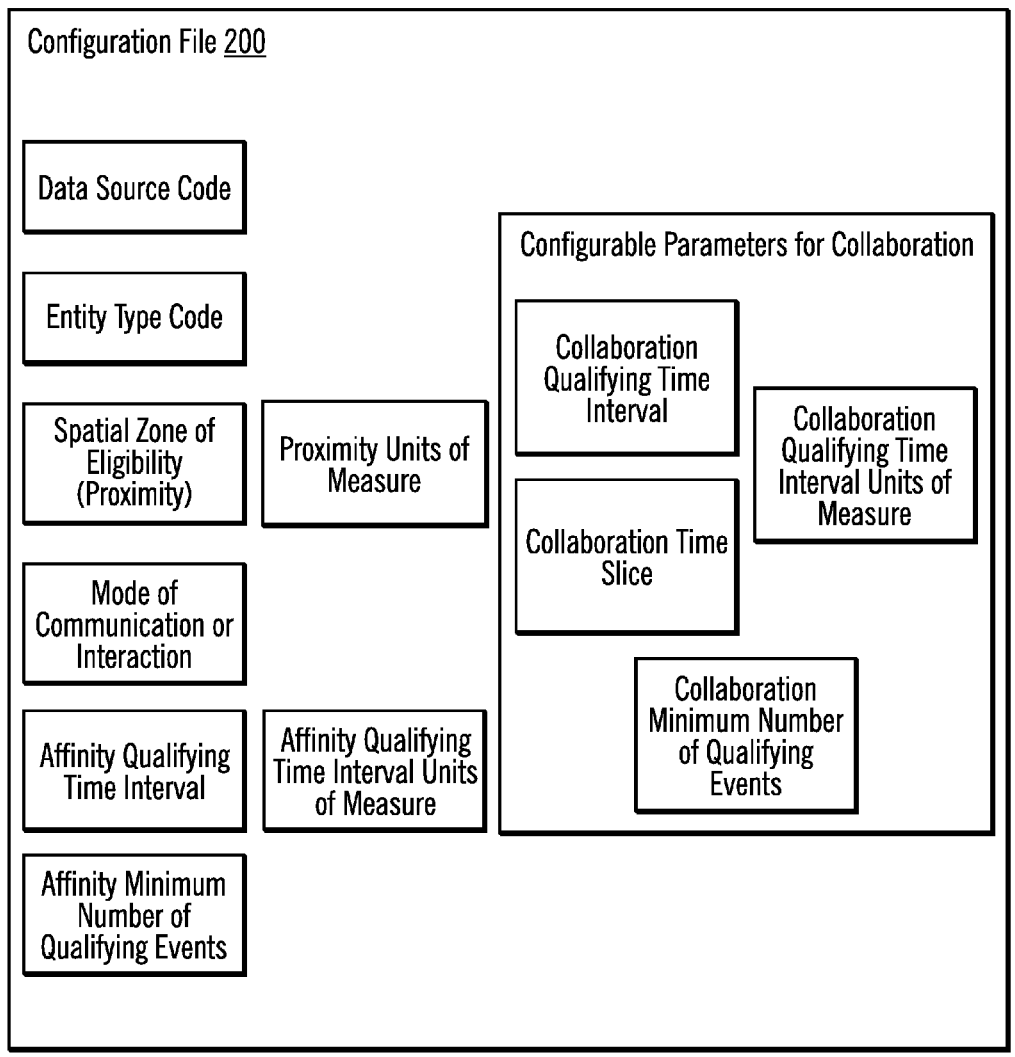
FIG. 2 illustrates an example configuration file in accordance with certain embodiments.

FIG. 2 illustrates an example configuration file 200 in accordance with certain embodiments. The configuration file (or an affinity configuration record or equivalent data) is used to configure "what is defined as affinity" and "what is defined as a collaboration". The configurable parameters for "what is defined as affinity" may include a qualifying time interval and a minimum number of events for any given data source, entity type, geographic area, and/or communication/interaction type. The configurable parameters for "what is defined as collaborators" may include a qualifying number of affinity findings, involving any given pair of entities, that fit criteria for reporting the entities as collaborators. A parameter that may further define collaborators is an additional qualifying time interval within which the affinities must accumulate to qualify a collaboration finding. A parameter that may yet further define collaborators is a time slice duration, within the additional qualifying time interval, within which repeating affinity findings do not count toward the affinity accumulation that qualifies as collaboration finding. When the qualifying conditions for an affinity finding are met, the detector 110a ... 110n may produce an affinity record (e.g. an Extensible Markup Language (XML) structure) for the identified entities, or it may simply track the affinity finding in memory without producing any further record besides the memory content itself. When the qualifying conditions for a collaboration finding are met, the detector 110a ... 110n produces a collaboration record (e.g. an Extensible Markup Language (XML) structure) for the entity.

The configuration file may associate data sources, entity types, and identifiers for zones of spatial eligibility or interaction eligibility with time and event thresholds. For the configuration file 200, the configurable parameters for basic collaborator reporting may include the following:

DSRC_CODE—Data source code

An identifier designating the data source, e.g., "AIS" (which indicates the Automatic Identification System used on ships and by vessel traffic services (VTS)).

ETYPE_CODE—Entity type code

An identifier designating the entity type, e.g., "VESSEL".

PROXIMITY—Spatial zone of eligibility

An identifier for a distance within which two entities may be considered to physically meet. If the value in this field is zero, then distance is unlimited (i.e. not an eligibility factor). In certain embodiments, the proximity is determined in meters. In other embodiments, the proximity is specified with other units or systems of measure, such as seconds of arc for certain geospatial navigation systems, or proximity to an RFID transponder for RFID-based systems.

PROXIMITY_UNITS—Spatial zone of eligibility units of measure

An identifier for the units of measure applicable to the PROXIMITY value. For example, acceptable identifiers may include kilometers, meters, or millimeters.

INTERACTION_MODE—Mode of communication (e.g., electronic mail (e-mail), on-line chat, telephone conversation or teleconference, wireless radio communication, wire-line communication, etc.) or interaction between entities (e.g. conversational, event-driven, etc.).

An identifier for a mode of communication or interaction via which entities may be considered to virtually meet. If the value in this field is zero, then interaction modes are unlimited (i.e., not an eligibility factor).

AFFINITY_QUAL_TIME_INTERVAL—Affinity qualifying time interval

A numeric value representing a time horizon, which is a maximum qualifying time interval in which a meeting or interaction becomes time-qualified for an affinity finding. A meeting or interaction may also need to qualify based on the number of events specified in the AFFINITY_MIN_EVENTS field described below.

AFFINITY_QUAL_TIME_UNITS—Affinity qualifying time units of measure

An identifier for the units of measure applicable to the AFFINITY_QUAL_TIME_INTERVAL value. For example, acceptable identifiers may include year, month, day, hour, minutes, seconds, and milliseconds.

AFFINITY_MIN_EVENTS—Affinity minimum number of qualifying events

A numeric value representing the minimum qualifying number of events that are observed before the meeting or interaction becomes qualified for an affinity finding. A meeting or interaction may also need to qualify based on the time horizon specified in the AFFINITY_QUAL_TIME_INTERVAL and AFFINITY_QUAL_TIME_UNITS fields.

COLLABORATION_QUAL_TIME_INTERVAL—Collaboration qualifying time interval

A numeric value representing a time horizon, which is a qualifying time interval in which affinities become time-qualified for a collaboration finding. An affinity may also need to qualify based on the number of events specified in the COLLABORATION_MIN_EVENTS field described below.

COLLABORATION_TIME_SLICE—Collaboration time slice

A numeric value representing a time slice, or quantum of time within the interval set by the COLLABORATION_QUAL_TIME_INTERVAL value, during which no more than one affinity qualifies for a collaboration finding. In certain embodiments, when more than one affinity is found within this time interval, only one of them becomes time-qualified for a collaboration finding. If the value in this field is zero, then the minimum time between affinity findings is unlimited (i.e. not an eligibility factor).

COLLABORATION_QUAL_TIME_UNITS—Collaboration qualifying time interval and time slice units of measure An identifier for the units of measure applicable to the COLLABORATION_QUAL_TIME_INTERVAL and COLLABORATION_TIME_SLICE values. For example, acceptable identifiers may include year, month, day, hour, minutes, seconds, and milliseconds.

COLLABORATION_MIN_EVENTS—Collaboration minimum number of qualifying events

A numeric value representing the minimum qualifying number of affinities that are observed in different collaboration time slices before the set of meetings or interactions represented by the affinities becomes qualified for a collaboration finding. An affinity also may need to qualify based on the time horizon specified in the COLLABORATION_QUAL_TIME_INTERVAL and COLLABORATION_QUAL_TIME_UNITS fields.

For example, configuration data for people interacting via email might define a five-day qualifying interval for affinity, and a three-occasion number of messages. This would indicate that an affinity finding may be generated for any two people who exchange email on three or more occasions within five days. The configuration data may further include a thirty-day collaboration qualifying interval over which collaborations may be detected, a ten-day collaboration time slice, and a minimum of two occasions on which an affinity must be found in different collaboration time slices, in order to qualify as a collaboration finding. If an embodiment thus configured observes an ongoing stream of email, then it could generate a collaboration report if on at least two occasions in separate ten-day timeframes, the two people exchange enough emails to qualify for affinity reporting.

As another example, configuration data for vessels might similarly define a five-day qualifying interval for affinity, and a three-occasion number of events on which the vessels are observed within a given spatial proximity of one another. This would indicate that an affinity report may be generated for any two vessels that meet on three or more occasions within five days. The configuration data may further include a sixty-day duration over which collaborations may be detected, a collaboration time slice of twenty days, and a minimum of three occasions on which affinity must be found at more than one collaboration time slice, in order to qualify a collaboration finding. If an embodiment thus configured observes an ongoing series of encounters within the designated proximity, even if those encounters are not all in a common vicinity or geospatial region, then it could generate a collaboration report if on at least three occasions in separate twenty-day timeframes, the two vessels are observed within the designated proximity of one another to an extent sufficient to qualify for affinity reporting.

In certain embodiments, for an XML message specifying an observation of an entity that has a latitude, longitude, and time associated with it, the detector $110a$ . . . $110n$ may consider any pair of entities observed sufficiently close to the same latitude and longitude, within the same generalized time interval, to qualify as an event for tracking purposes. A generalized time interval may be a time range determined by any technique that divides time into quanta of a configurable duration. The detector $110a$ . . . $110n$ may consider any pair of entities that correspond via a qualifying interaction mode within the same generalized time interval to similarly qualify as a tracked event. If sufficient tracked events accumulate within the qualifying duration and meet the eligibility requirements, then the detector $110a$ . . . $110n$ flags an affinity. In certain embodiments, the detector considers any event accumulation (not qualified as an affinity) that has exceeded the configured time horizon to be expired for purposes of basic affinity reporting. That is, the detector $110a$ . . . $110n$ generates no affinity report once the relevant events have expired. Rather, the detector $110a$ . . . $110n$ deallocates the memory for those accumulated events.

Based on an option designated EXPIRE_EVENTS_BY_TIME_INTERVAL (illustrated in FIG. 3 as Expire Events by Time Interval Selector), the detector $110a$ . . . $110n$ may alternatively track events associated with complete generalized time intervals. The detector $110a$ . . . $110n$ may then consider any event older than either the configured time horizon or the limit of the time interval to be expired. The detector $110a$ . . . $110n$ also may deallocate event records that have expired based on either the configured time horizon or the time interval, if the EXPIRE_EVENTS_BY_TIME_INTERVAL option is set.

For rapid entity and event lookup, the detector $110a$ . . . $110n$ may track entities in a binary search tree, in a skiplist sorted by numeric entity keys, or in any other data structure suited for rapid access to data elements in a large set. The event queues associated with each tracked entity may be First In First Out (FIFO) queues or lists. A queue cleanup thread may routinely inspect the tracked entities and corresponding tracked events, deallocating the tracking structures associated with any events older than the qualifying duration. The queue cleanup thread also can deallocate the tracking structures associated with any entities whose event queues have become entirely empty. Queue cleanup may be triggered on a periodic basis, or when memory or another resource falls below a threshold of availability, or when a Central Processing Unit (CPU) becomes idle.

When the detector $110a$ . . . $110n$ flags a detected basic affinity condition, the detector $110a$ . . . $110n$ may do so by passing data about the affinity to a user or to other software (e.g., an entity analytics engine) via data encoded, for example, as XML. The XML data may describe an observed feature of an entity as defined by the entity analytics engine (e.g., in the case of some entity analytics technology, with a feature type code of BEHAVIOR_KEY and a usage type code of AFFINITY; the XML data also may include a feature element whose code is EXPRESSION and whose value is a key corresponding to a spatial region in which the entities were most recently observed to have affinity). The following is an example of a prospective affinity record represented in XML:

```
<UMF_DOC>                                              Input document tag
    <OBS>                                              Observation tag
        <DSRC_CODE>AIS/DSRC_CODE>                      Data describing a data source
and observation
        <DSRC_ACTION>A</DSRC_ACTION>
        <OBS_SRC_KEY>
            477995071|2010-08-12 15:24:00</ OBS_SRC_KEY>
            <SRC_CREATE_DATE>2010-08-12 15:24:00</SRC_CREATE_DATE >
            <OBS_ENT>                                  Observed entity tag
                <ETYPE_CODE>VESSEL</ETYPE_CODE>        Data describing an entity
                <ENT_SRC_KEY>477995071|2010-08-12 15:24:00</ENT_SRC_KEY>
                <ENT_SRC_DESC>477995071|2010-08-12 15:24:00</ENT_SRC_DESC>
                <OBS_FEAT>
```

```
        <FTYPE_CODE>MMSI_NUM</FTYPE_CODE>           Data describing a feature
        <OBS_FELEM>
           <FELEM_CODE>ID_NUM</FELEM_CODE>
           <FELEM_VALUE>477995071</FELEM_VALUE>
        </OBS_FELEM>
      </OBS_FEAT>
      <OBS_FEAT>
         <FTYPE_CODE>BEHAVIOR_KEY</FTYPE_CODE>      Affinity feature data
         <UTYPE_CODE>AFFINITY</UTYPE_CODE>
         <USED_FROM_DT>
           2010-08-12 14:24:00</ USED_FROM_DT>
             <USED_THRU_DT>
           2010-08-12 15:24:00</ USED_THRU_DT>
         <OBS_FELEM>
             <FELEM_CODE>EXPRESSION</FELEM_CODE>   Affinity feature
element data
             <FELEM_VALUE>GR1_GH4_1HOUR|xn73|2010-08-12
14:24:00</FELEM_VALUE>
           </OBS_FELEM>
         </OBS_FEAT>
      </OBS_ENT>
    </OBS>
</UMF_DOC>
```

Examples of affinities that may be identified among entities include:
- Vessels that meet somewhere in the ocean, possibly at various locations over time.
- Cells of a certain type that proliferate in a patient's bloodstream.
- Persons who telephone one another regularly.
- Individual animals that mingle within a sizeable group and habitat.

The configuration file may be extended to configure "what is defined as a gathering". These extended configurable parameters may include a qualifying number of entities that are in physical proximity, within the PROXIMITY criterion or that communicate or interact via the mode specified via the INTERACTION_MODE identifier. The extended configurable parameters also may include a setting that indicates whether affinity findings, on their own, shall be reported.

Figure 3:
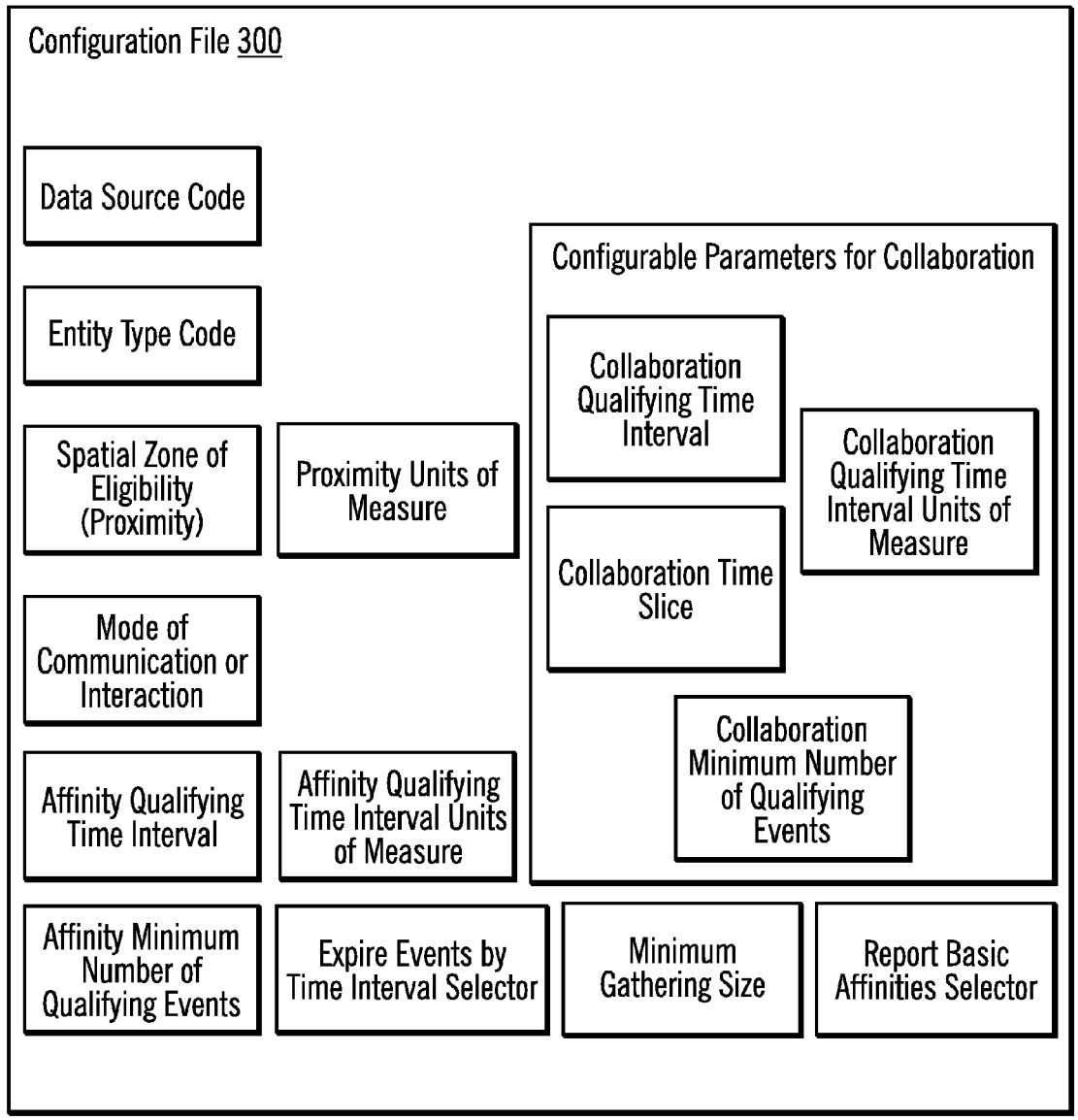
FIG. 3 illustrates an example extended configuration file in accordance with certain embodiments.

FIG. 3 illustrates an example extended configuration file 300 in accordance with certain embodiments. For the extended configuration file 300, the extended configurable parameters for reporting gatherings and collaborators may include the following:

MIN_GATHERING_SIZE—Minimum gathering size

An identifier for the number of entities that qualifies as a gathering. If this field is empty, no gatherings are reported.
REPORT_BASIC_AFFINITIES—Report Basic Affinities selector (storing Yes or No)

Enables basic affinity reporting or disables basic affinity reporting to better highlight gatherings and/or collaborators reporting.

In one embodiment, a gathering may be reported when MIN_GATHERING_SIZE entities are observed to have affinity within a spatial zone that is PROXIMITY units across. In an alternate embodiment, a gathering may be reported more loosely, i.e. for any set of entities where, for each entity, there can be found at least one other entity in the set that is observed within PROXIMITY units of that entity.

Certain embodiments determine that the first entity and the second entity are physically interacting when the first entity is within a certain spatial proximity of the second entity. Certain embodiments determine that the first entity and the second entity are virtually interacting when the first entity communicates electronically or via other signaling means with the second entity. Certain embodiments identify a mode with which the first entity communicates with the second entity. Certain embodiments identify more than two entities as interacting. With embodiments, the entities may include persons, animals, plants, buildings, cars, events and any other places, things, objects, etc. In certain embodiments, reporting of collaborators and/or gatherings may rely on evaluation of daily affinity records. These records may be treated as events. In one embodiment, the events are streamed to another process that determines collaborations and/or gatherings based on collections of affinity reports. Whether one or multiple processes are used, an example of this analysis may involve daily affinity reports treated as behavior to roll up to weekly or monthly collaborator and/or gathering reports.

Embodiments provide privacy enhanced identification of collaborating entities. For example, embodiments may generate an anonymous identifier for each entity. Then, when affinities, or gatherings, or collaborating entities are detected, the embodiments provide (e.g., in a report) the anonymous identifier for the collaborating entities, in lieu of any identifier that may be known outside the scope of the system embodying the invention. Thus, the entities are provided with privacy protection. In some embodiments, anonymized identifiers are the only entity identifiers available throughout the process of identifying affinities, gatherings, or collaborators. In some embodiments, these anonymized identifiers are provided in inbound records and can be returned in reports of affinities, gatherings, or collaborators reflecting the anonymized identifiers. In some embodiments, the reports generated contain no identifying information whatsoever and may simply indicate that an affinity, gathering, or collaboration is detected, along with the number of entities involved in the affinity, gathering, or collaboration.

FIGS. 4A, 4B, 4C, and 4D illustrate, in a flowchart, operations for identifying collaborating entities and gatherings in accordance with certain embodiments. Control begins at block 400 with the detector 110a . . . 110n receiving an inbound observation for an observed entity. In block 402, the detector 110a . . . 100n determines whether the observed entity is of a configured type. If so, processing continues to block 404, otherwise, processing loops back to block 400. In block 404, the detector 110a . . . 100n obtains an entity identifier, a spatial location, and a timestamp for the inbound observation.

Figure 4A:
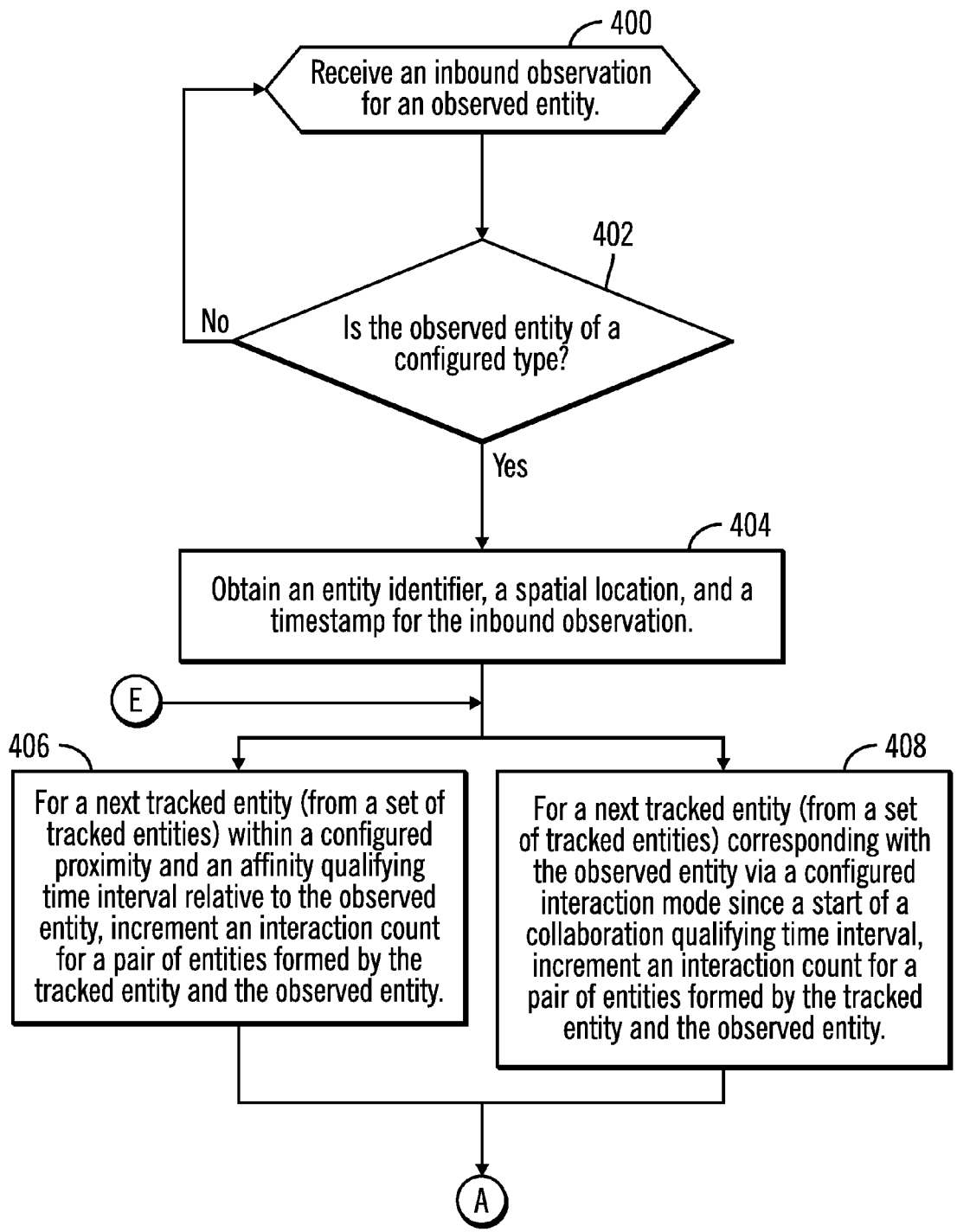
FIGS. 4A, 4B, 4C, and 4D illustrate, in a flowchart, operations for identifying collaborating entities and gatherings in accordance with certain embodiments.
Figure 4B:
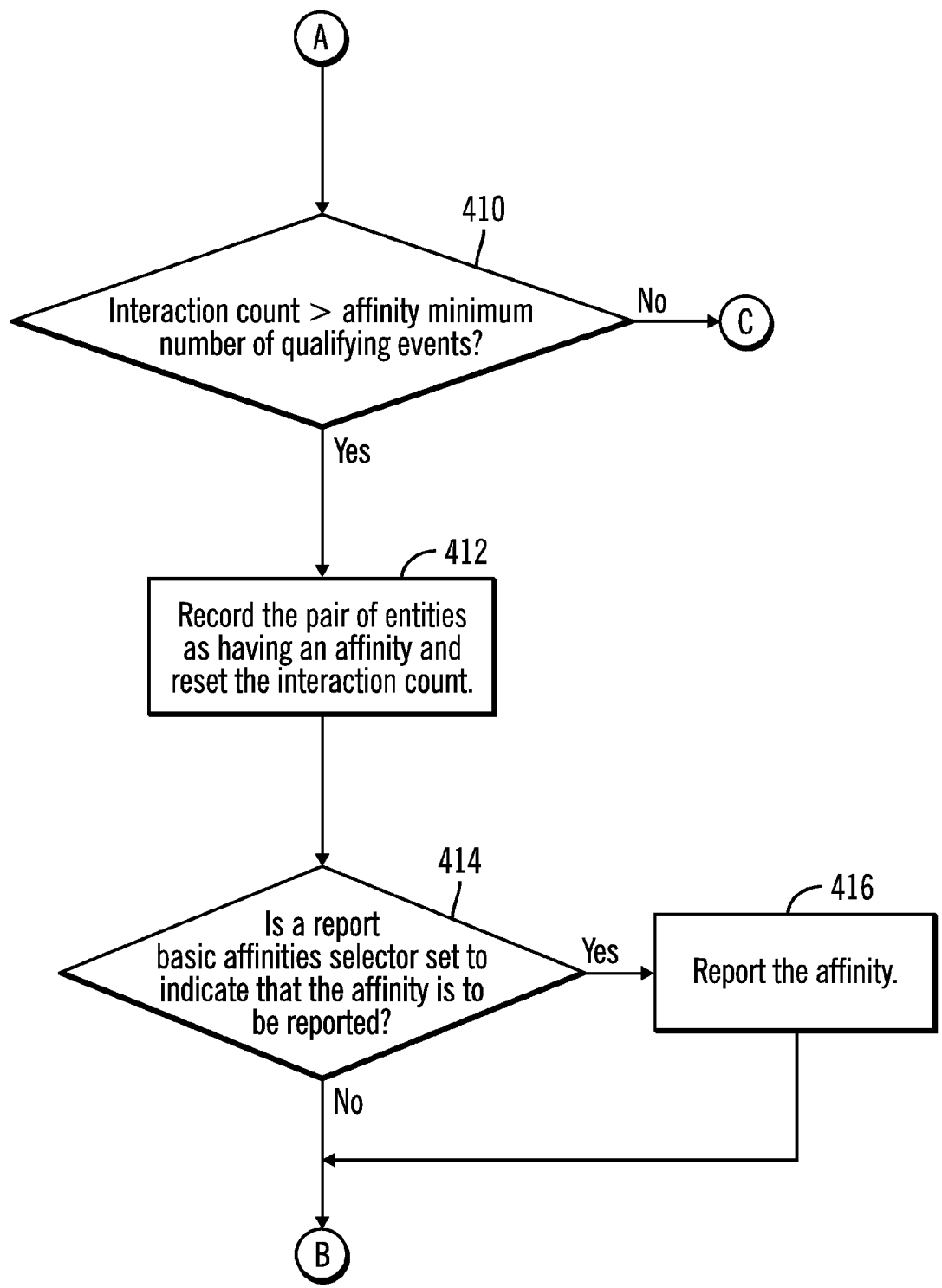

In block 406, the detector 110a ... 100n, for a next tracked entity (from a set of tracked entities for which tracking data is stored in data store 150) within a configured proximity and an affinity qualifying time interval relative to the observed entity, increments an interaction count for a pair of entities formed by the tracked entity and the observed entity. From block 406 (FIG. 4A), processing continues to block 410 (FIG. 4B).

In block 408, the detector 110a ... 100n, for a next tracked entity (from a set of tracked entities) corresponding with the observed entity via a configured interaction mode since a start of a collaboration qualifying time interval, increments an interaction count for a pair of entities formed by the tracked entity and the observed entity. From block 408 (FIG. 4A), processing continues to block 410 (FIG. 4B).

Embodiments may implement a single loop that processes blocks 406 and 408 iteratively, and in some instances concurrently, with each other and/or with blocks 410 through 430, inclusive. In such embodiments, the interaction count of blocks 406 and 408 may be one and the same. In alternative embodiments, a first loop may process block 406 and blocks 410 through 430, inclusive, and a second loop may process block 408 and blocks 410 through 430, inclusive, in which case the interaction count may be reset between loops or may be defined as a separate value per loop. Some embodiments may implement either block 406 without implementing block 408 or may implement block 408 without implementing block 406.

Figure 4C:
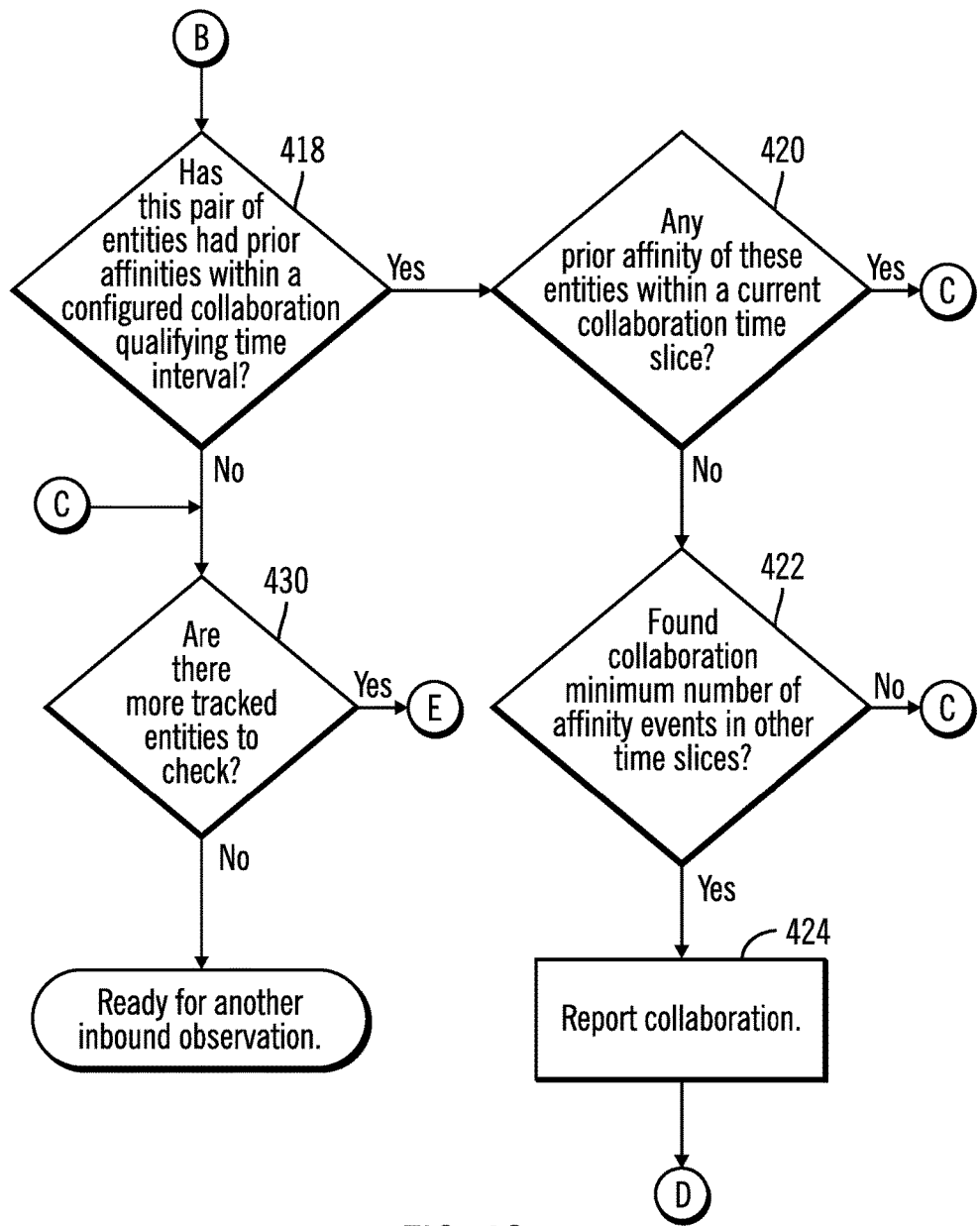

In block 410, the detector 110a ... 100n determines whether the interaction count is greater than an affinity minimum number of qualifying events. If so, processing continues to block 412, otherwise, processing continues to block 430 (FIG. 4C)

In block 412, the detector 110a ... 100n records the pair of entities (formed by the tracked entity and the observed entity) as having an affinity and resets (e.g., clears) the interaction count. In block 414, the detector 110a ... 100n determines whether a report basic affinities selector is set to indicate that the affinity is to be reported. If so, processing continues to block 416, otherwise, processing continues to block 418 (FIG. 4C). In block 416, the detector 110a ... 100n reports the affinity.

Figure 4D:
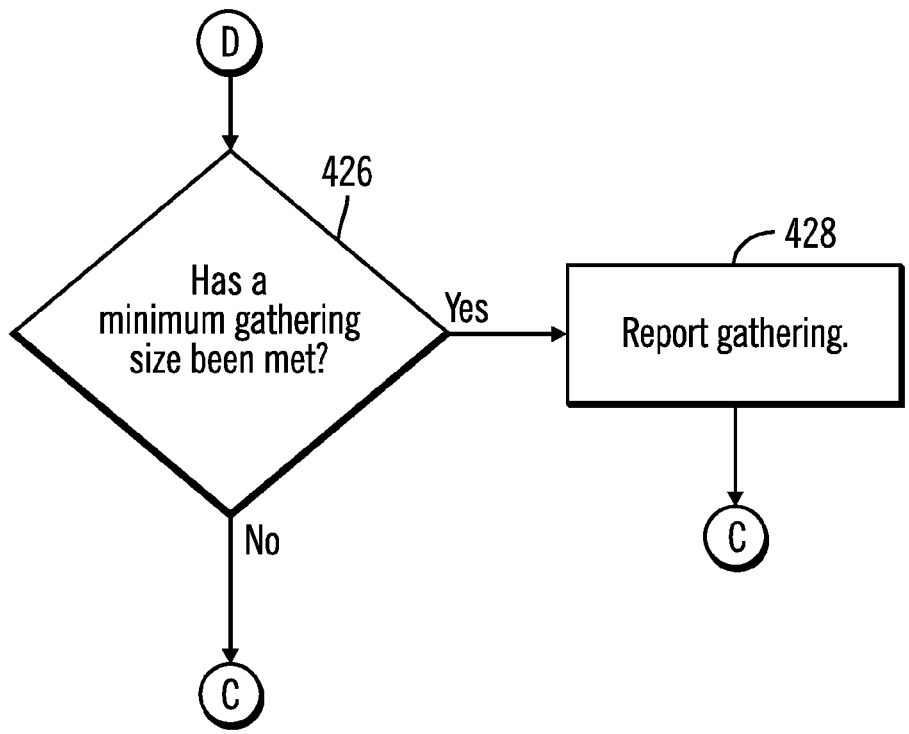

In block 418, the detector 110a ... 100n determines whether this pair of entities had prior affinities within a configured collaboration qualifying time interval. If so, processing continues to block 420, otherwise, processing continues to block 430. In block 420, the detector 110a ... 100n determines whether any prior affinity of these entities is within a current collaboration time slice. If so, processing continues to block 422, otherwise, processing continues to block 430. In block 422, the detector 110a ... 100n determines whether a collaboration minimum number of affinity events in other time slices have been found. If so, processing continues to block 424, otherwise, processing continues to block 430. In block 424, the detector 110a ... 100n reports a collaboration. From block 424 (FIG. 4C), processing continues to block 426 (FIG. 4D).

In block 426, the detector 110a ... 100n determines whether a minimum gathering size has been met. If so, processing continues to block 428, otherwise, processing continues to block 430 (FIG. 4C). In block 428, the detector 110a ... 100n reports the gathering.

In block 430, the detector 110a ... 100n determines whether there are more tracked entities to check (i.e. for further potential findings of affinities, collaborations, and/or gatherings among the tracked entities). If so, processing continues to blocks 406 (FIG. 4A) and 408 (FIG. 4A), otherwise, processing waits for another inbound observation.

In certain embodiments, the outcome of the processing of FIG. 4 as performed in accordance with a given set of qualifying conditions (as described with respect to FIG. 2 and FIG. 3) may be validated against a criterion. As previously disclosed herein, to qualify as collaborators, any two or more entities must have been qualified to generate affinity reports on at least the minimum number of occasions at intervals greater than or equal to the threshold time interval. Thus, if the number of reports is not in keeping with a criterion, the processing of FIG. 4 may be re-run given different qualifying conditions, either automatically (e.g. via machine learning or heuristic algorithms) or by referencing one or more different configuration files.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
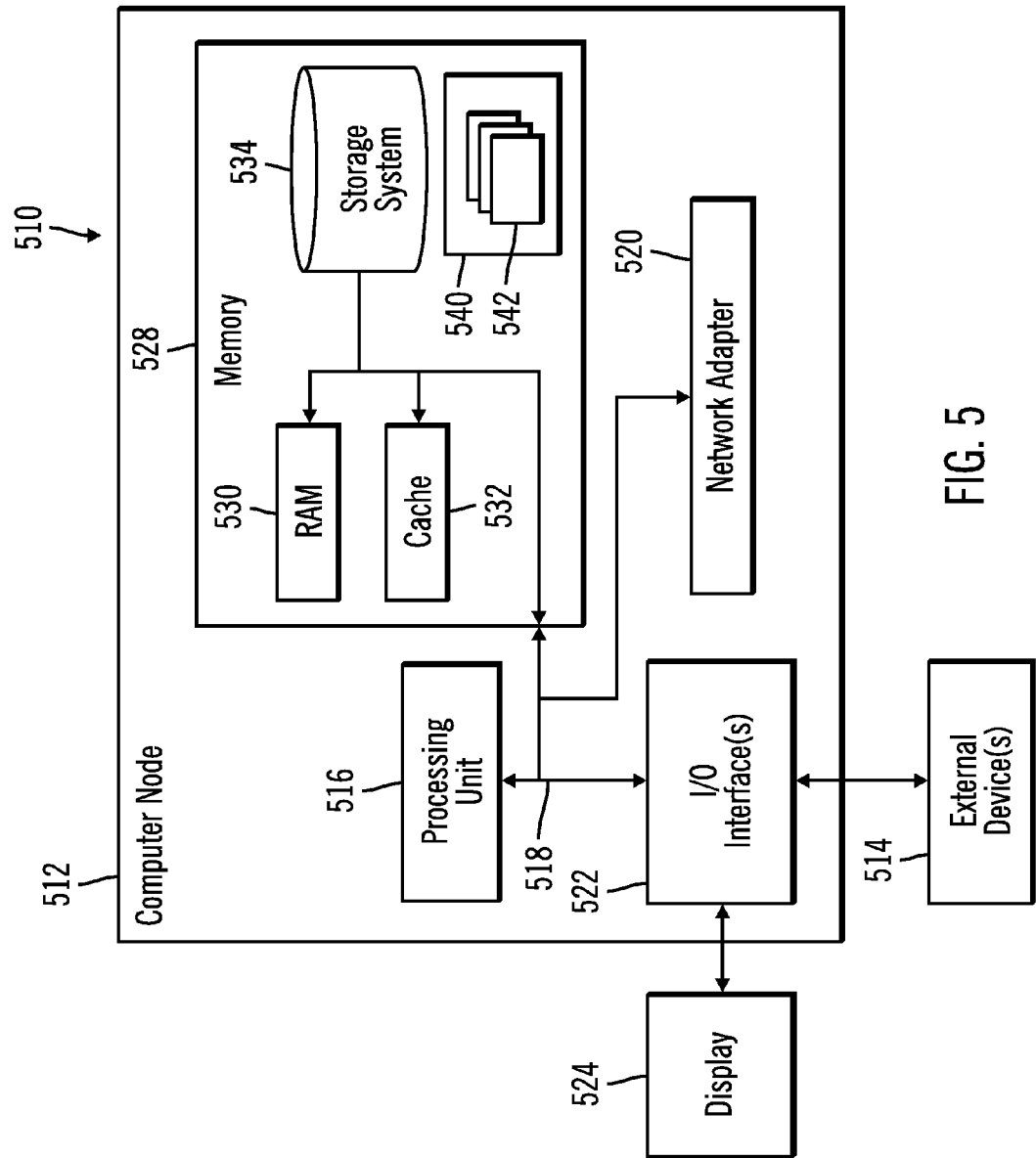
FIG. 5 illustrates a cloud computing node in accordance with certain embodiments.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), a solid-state media device (e.g. a USB or SSD storage device or an SD card), and an optical disk drive for reading from or writing to a removable, non-volatile optical disk such as a CD-ROM, DVD-ROM, Blu-Ray, or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
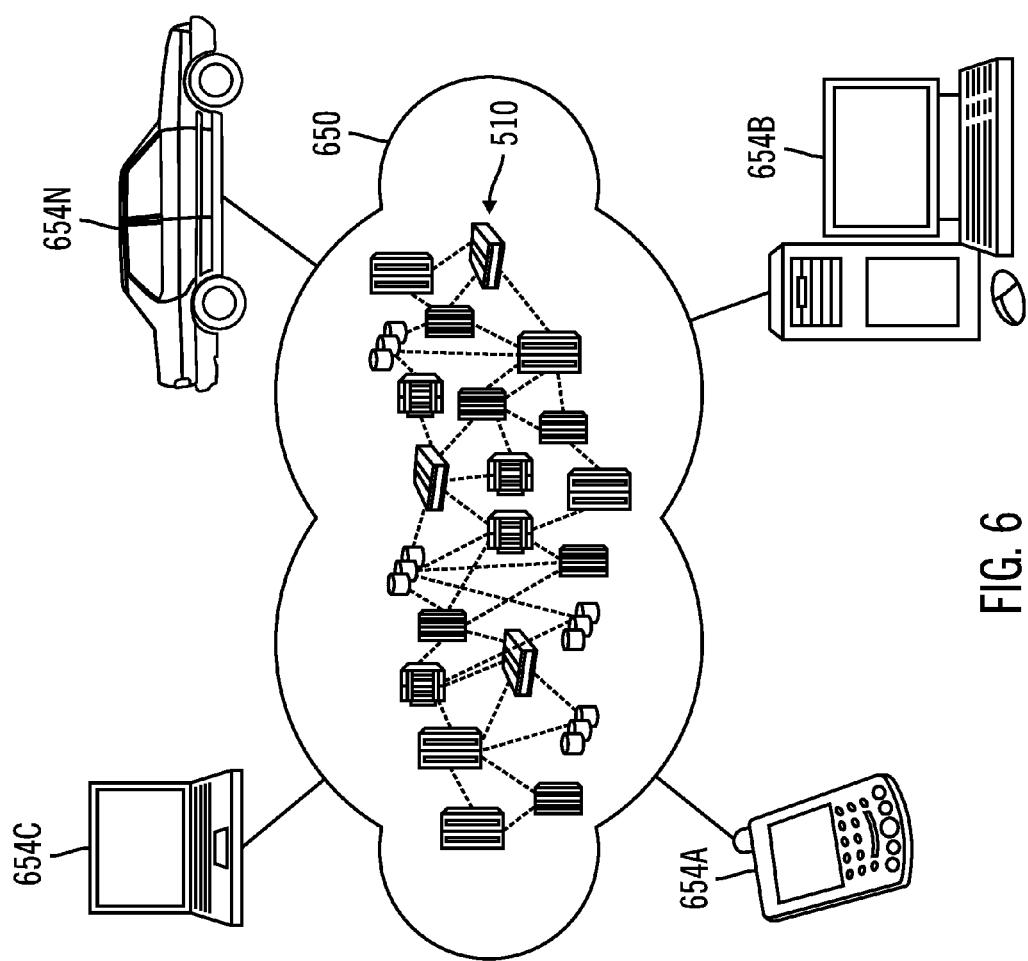
FIG. 6 illustrates a cloud computing environment in accordance with certain embodiments.

Referring now to FIG. 6, illustrative cloud computing environment 650 is depicted. As shown, cloud computing environment 650 comprises one or more cloud computing nodes 510 with which local computing devices used by cloud consumers, such as, for example, personal digital assistant (PDA) or cellular telephone 654A, desktop computer 654B, laptop computer 654C, and/or automobile computer system 654N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 510 and cloud computing environment 650 can communicate with any type of computerized device over any type of network and/or network addressable connection (e.g., using a web browser).

Figure 7:
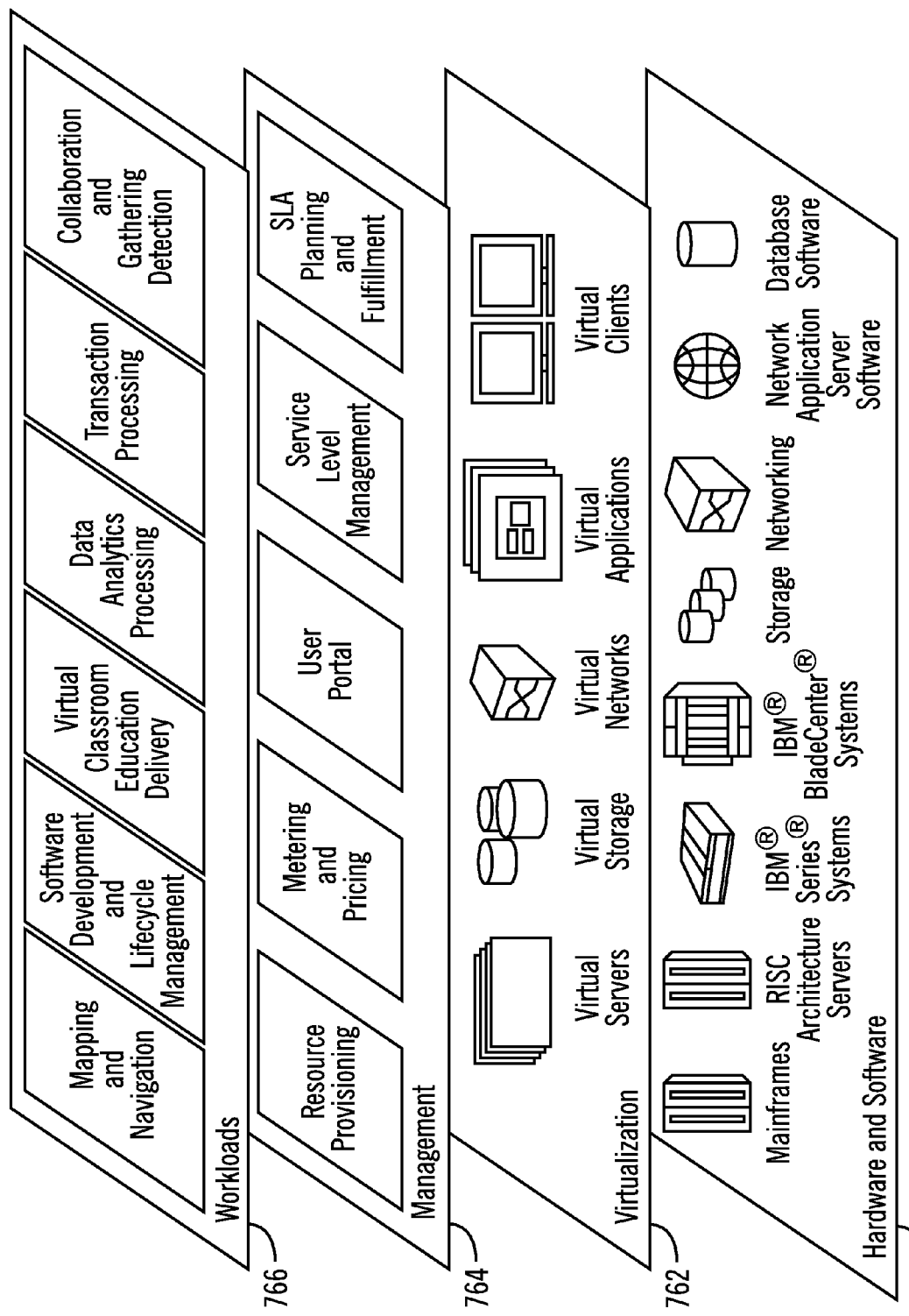
FIG. 7 illustrates abstraction model layers in accordance with certain embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and that embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and collaboration and gathering detection.

Thus, in certain embodiments, software or a program, implementing collaboration and gathering detection in accordance with embodiments described herein, is provided as a service in a cloud environment.

In certain embodiments, the computing nodes 100a . . . 100n each have the architecture of computing node 510. In certain embodiments, the computing nodes 100a . . . 100n are part of a cloud environment. In certain alternative embodiments, the computing nodes 100a . . . 100n are not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disc (DVD) or Blu-Ray disc, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining relationships between entities, comprising:
storing, using a processor of computer a, a configuration file, wherein the configuration file stores configurable parameters for an affinity, for a collaboration, and for a gathering,
wherein the configurable parameters for the affinity include an affinity qualifying time interval and an affinity minimum number of qualifying events,
wherein the configurable parameters for the collaboration include a collaboration qualifying time interval, a collaboration minimum number of qualifying events, and a collaboration time slice, and
wherein the configurable parameters for the gathering include a minimum gathering size and a proximity;
generating a first anonymous identifier for a first entity and a second anonymous identifier for a second entity;
finding a first instance of affinity between the first entity and the second entity based on determining that the first entity is associated with the second entity for at least the affinity minimum number of qualifying events for the affinity qualifying time interval, wherein the affinity is physical affinity when the first entity is situated within a certain spatial proximity of the second entity for at least the affinity minimum number of qualifying events for the affinity qualifying time interval, and wherein the affinity is virtual affinity when the first entity communicates with the second entity for at least the affinity minimum number of qualifying events for the affinity qualifying time interval;

identifying a collaboration of the first entity and the second entity based on the first instance of affinity and one or more second instances of affinity found that meet the collaboration minimum number of qualifying events within the collaboration qualifying time interval, wherein one affinity is determined to be one qualifying event within each collaboration time slice;

reporting the collaboration of the first entity and the second entity using the first anonymous identifier and the second anonymous identifier for privacy enhanced identification of the collaboration;

identifying a gathering of the first entity and the second entity with additional entities meeting the minimum gathering size, wherein the first entity, the second entity, and the additional entities are within the proximity of each other for a period of time; and reporting the gathering using the first anonymous identifier, the second anonymous identifier, and additional anonymous identifiers for the additional entities for privacy enhanced identification of the gathering.

2. The method of claim 1, further comprising:
identifying a mode via which the first entity communicates with the second entity.

3. The method of claim 1, further comprising:
determining instances of affinity among entities of various types.

4. The method of claim 1, further comprising:
updating the configurable parameters.

5. The method of claim 1, wherein a Software as a Service (SaaS) is configured to perform method operations.

6. A computer program product, the computer program product comprising:
a computer readable storage medium having program code embodied therewith, the program code executable by at least one processor perform:
storing a configuration file, wherein the configuration file stores configurable parameters for an affinity, for a collaboration, and for a gathering,
wherein the configurable parameters for the affinity include an affinity qualifying time interval and an affinity minimum number of qualifying events,
wherein the configurable parameters for the collaboration include a collaboration qualifying time interval, a collaboration minimum number of qualifying events, and a collaboration time slice, and
wherein the configurable parameters for the gathering include a minimum gathering size and a proximity;
generating a first anonymous identifier for a first entity and a second anonymous identifier for a second entity;
finding a first instance of affinity between the first entity and the second entity based on determining that the first entity is associated with the second entity for at least the affinity minimum number of qualifying events for the affinity qualifying time interval, wherein the affinity is physical affinity when the first entity is situated within a certain spatial proximity of the second entity for at least the affinity minimum number of qualifying events for the affinity qualifying time interval, and wherein the affinity is virtual affinity when the first entity communicates with the second entity for at least the affinity minimum number of qualifying events for the affinity qualifying time interval;

identifying a collaboration of the first entity and the second entity based on the first instance of affinity and one or more second instances of affinity found that meet the collaboration minimum number of qualifying events within the collaboration qualifying time interval, wherein one affinity is determined to be one qualifying event within each collaboration time slice;

reporting the collaboration of the first entity and the second entity using the first anonymous identifier and the second anonymous identifier for privacy enhanced identification of the collaboration;

identifying a gathering of the first entity and the second entity with additional entities meeting the minimum gathering size, wherein the first entity, the second entity, and the additional entities are within the proximity of each other for a period of time; and reporting the gathering using the first anonymous identifier, the second anonymous identifier, and additional anonymous identifiers for the additional entities for privacy enhanced identification of the gathering.

7. The computer program product of claim 6, wherein the program code is executable by the at least one processor to perform:
identifying a mode via which the first entity communicates with the second entity.

8. The computer program product of claim 6, wherein a Software as a Service (SaaS) is configured to perform computer program product operations.

9. The computer program product of claim 6, wherein the program code is executable by the at least one processor to perform:
determining instances of affinity among entities of various types.

10. The computer program product of claim 6, wherein the program code is executable by the at least one processor to perform:
updating the configurable parameters.

11. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
storing a configuration file, wherein the configuration file stores configurable parameters for an affinity, for a collaboration, and for a gathering,
wherein the configurable parameters for the affinity include an affinity qualifying time interval and an affinity minimum number of qualifying events,
wherein the configurable parameters for the collaboration include a collaboration qualifying time interval, a collaboration minimum number of qualifying events, and a collaboration time slice, and
wherein the configurable parameters for the gathering include a minimum gathering size and a proximity;
generating a first anonymous identifier for a first entity and a second anonymous identifier for a second entity;
finding a first instance of affinity between the first entity and the second entity based on determining that the first entity is associated with the second entity for at least the affinity minimum number of qualifying events for the affinity qualifying time interval, wherein the affinity is physical affinity when the first entity is situated within a certain spatial proximity of the second entity for at least the affinity minimum number of qualifying events for the affinity qualifying time interval, and wherein the affinity is virtual affinity when the first entity communicates with the second entity for at least the affinity minimum number of qualifying events for the affinity qualifying time interval;

identifying a collaboration of the first entity and the second entity based on the first instance of affinity and one or more second instances of affinity found that meet the collaboration minimum number of qualifying events within the collaboration qualifying time interval, wherein one affinity is determined to be one qualifying event within each collaboration time slice;

reporting the collaboration of the first entity and the second entity using the first anonymous identifier and the second anonymous identifier for privacy enhanced identification of the collaboration;

identifying a gathering of the first entity and the second entity with additional entities meeting the minimum gathering size, wherein the first entity, the second entity, and the additional entities are within the proximity of each other for a period of time; and reporting the gathering using the first anonymous identifier, the second anonymous identifier, and additional anonymous identifiers for the additional entities for privacy enhanced identification of the gathering.

12. The computer system of claim 11, wherein the operations further comprise:

identifying a mode via which the first entity communicates with the second entity.

13. The computer system of claim 11, wherein a Software as a Service (SaaS) is configured to perform computer system operations.

14. The computer system of claim 11, wherein the operations further comprise:

updating the configurable parameters.

15. The computer system of claim 11, wherein the operations further comprise: determining instances of affinity among entities of various types.

* * * * *